(12) United States Patent
Dean et al.

(10) Patent No.: US 8,959,826 B2
(45) Date of Patent: Feb. 24, 2015

(54) WATERFOWL DECOY SYSTEM AND APPARATUS

(71) Applicants: William Dean, Bridgeport, NE (US); Greg Wickard, Bridgeport, NE (US)

(72) Inventors: William Dean, Bridgeport, NE (US); Greg Wickard, Bridgeport, NE (US)

( * ) Notice: Subject to any disclaimer, the term of this patent is extended or adjusted under 35 U.S.C. 154(b) by 200 days.

(21) Appl. No.: 13/758,520

(22) Filed: Feb. 4, 2013

(65) Prior Publication Data
US 2013/0199076 A1 Aug. 8, 2013

Related U.S. Application Data

(60) Provisional application No. 61/594,635, filed on Feb. 3, 2012.

(51) Int. Cl.
*A01M 31/06* (2006.01)
(52) U.S. Cl.
CPC .................... *A01M 31/06* (2013.01)
USPC .......................... 43/3; 43/2; 446/61
(58) Field of Classification Search
CPC ................ A01M 31/06; B64C 31/06
USPC ........ 43/2, 3; 244/153 A, 153 R; 40/417, 411; 73/170.5; 446/61, 62
See application file for complete search history.

(56) References Cited

U.S. PATENT DOCUMENTS

| | | | | |
|---|---|---|---|---|
| 1,629,442 | A | * | 5/1927 | Geisinger .......................... 43/3 |
| 3,366,354 | A | * | 1/1968 | Sterba .......................... 244/154 |
| 5,172,506 | A | * | 12/1992 | Tiley et al. .......................... 43/3 |
| 6,044,581 | A | | 4/2000 | Shipman et al. |
| 6,769,950 | B1 | * | 8/2004 | Suciu .......................... 446/176 |
| 7,458,181 | B2 | * | 12/2008 | Butz .................................. 43/3 |
| 8,151,512 | B2 | * | 4/2012 | Latschaw .......................... 43/3 |
| 2002/0130221 | A1 | * | 9/2002 | Tabor .......................... 244/154 |
| 2011/0001012 | A1 | * | 1/2011 | Smith .......................... 244/155 A |

* cited by examiner

*Primary Examiner* — Darren W Ark
*Assistant Examiner* — Marc Burgess
(74) *Attorney, Agent, or Firm* — Sheridan Ross P.C.

(57) ABSTRACT

A flying decoy assembly that simulates the landing characteristics of waterfowl is provided. The simulated landing characteristics may include, but are not limited to, whiffling, gliding, floating, dipping, and/or flapping motions. The system generally comprises a waterfowl decoy pivotally interconnected to a stand. The decoy system can be used over water or in the field.

19 Claims, 3 Drawing Sheets

WATERFOWL DECOY SYSTEM AND APPARATUS

CROSS REFERENCE TO RELATED APPLICATIONS

This application claims the benefit of U.S. Provisional Patent Application No. 61/594,635, entitled "WATERFOWL DECOY SYSTEM AND APPARATUS" filed on Feb. 3, 2012, the entire disclosure of which is incorporated by reference herein.

FIELD

Embodiments of the present invention relate generally to a flying decoy assembly and apparatus, and more particularly to a waterfowl decoy assembly, system, and apparatus that simulates the flying and landing characteristics of waterfowl.

BACKGROUND

Viewing and hunting of birds are challenging and invigorating sports. The challenge these sports present often requires the use of decoys to attract birds near a particular location. Birds in flight are often attracted and flock to the location of other landing birds. Unfortunately, current waterfowl decoys do not simulate the flight landing characteristics of birds.

Current waterfowl decoys include feeders, goose socks, and spinning wing decoys. Feeder decoys are primarily used in the field and, if used in a decoy spread, can simulate a flock of geese feeding. Wind socks are decoys that move in the wind. Generally, the body of a wind sock fills with air when the wind blows, and provides the appearance of movement. Spinning wing decoys include wings that spin, and provide the appearance of movement. Generally, the wings spin about an attachment point on the body of the decoy. Feeder decoys, wind sock decoys, and spinning wing decoys can be useful in attracting birds to a particular location. However, none of these decoys simulate the flying and landing characteristics of birds, which may include whiffling, gliding, floating, dipping, and/or flapping motions.

Additionally, most states do not allow motorized decoys with flapping wings, moving parts, etc. The present invention simulates these motions, i.e., flying and landing characteristics of birds, without using motors, pulleys, cables, or other devices.

SUMMARY

The present disclosure is generally directed to a flying decoy assembly and apparatus that simulates the flying and/or landing characteristics of waterfowl, and thus attracts waterfowl to a particular location for viewing and/or hunting.

It is one aspect of the present disclosure to provide a flying decoy assembly that aligns with the wind. In one embodiment, the flying decoy assembly includes a stand configured to rotate about a rotation axis. The stand may elevate the decoy above the ground a distance of between two and fifteen feet. The rotation of the stand insures that an interconnected decoy will align with the wind direction. Thus, when the wind is blowing, an interconnected decoy faces into the wind, as do all waterfowl during landing.

It is another aspect of the present disclosure to provide a flying decoy assembly and apparatus that simulates a "whiffling" motion of a descending waterfowl. "Whiffling" refers to a rapid descent with a zig-zagging, side-slipping motion. Birds whiffle to quickly lose elevation by rotating their wings to dump air and reduce lift. In one embodiment, the flying decoy assembly includes a stand and a waterfowl decoy pivotally interconnected to the stand about a pivot axis. When the wind is blowing, the waterfowl decoy pivots, or rotates, about the pivot axis to simulate a whiffling motion of a waterfowl during landing. This aspect is important because waterfowl seldom whiffle unless they feel safe. Therefore, in one embodiment, the decoy system may include one or more whiffling decoys and one or more stationary decoys.

It is yet another aspect of the present disclosure to provide a flying decoy assembly and apparatus that simulates a gliding, floating, and/or dipping motion. In one embodiment, the flying decoy assembly includes a wing holder and a wing attachment that interconnects a waterfowl decoy to a stand. For example, in one embodiment, the wing holder interconnects to the stand, and the wing attachment interconnects the wing holder to the waterfowl decoy. In some embodiments, the wing attachment may be flexible, thus allowing the waterfowl decoy to move vertically and/or horizontally in relation to the stand. The motion of the decoy relative to the stand allows the decoy to move in accordance with changes in the wind speed, thus appearing to glide, float, and/or dip as the wind speed changes. In one embodiment, the wing attachment is a cord or string. In another embodiment, the wing attachment is not flexible and rather is stiff or not bendable. In some embodiments, the wing holder may be flexible to further enhance the gliding, floating, and/or dipping motions. The wing holder and the wing attachment may be constructed as a single component in various embodiments.

It is a further aspect of the present disclosure to provide a flying decoy assembly and apparatus that simulates a flapping motion. In one embodiment, a waterfowl decoy includes a body and two wings attached to opposing sides of the body. The body and the wings may be rigid to reduce deformation of the body and the wings. For example, a reinforcement member may be interconnected to the body and the wings. In one embodiment, at least a portion of the wings is flexible and is configured to move, or flap, when subjected to wind. In one embodiment, each wing includes a rigid component that is not interconnected to the body such that the wings flap individually from the body. In additional or alternative embodiments, a waterfowl decoy further includes a tail. In one configuration, the tail is flexible and configured to move, or flap, around a hinge point when subjected to wind. Thus, in some embodiments, a waterfowl decoy may include a pair of wings and a tail configured to flap in the wind. In a preferred embodiment, the tail portion is made of a flexible fabric material to allow significant movement and flapping with respect to the decoy body.

It is one aspect of the present disclosure to provide a stand constructed of common materials. In one embodiment, the stand is constructed of a wood, a metal, a metal alloy, material, and/or a plastic. For example, the stand may be constructed of wood, bamboo, steel, aluminum, plastic, fiberglass, carbon fibers, and/or other suitable materials known in the art. The stand may be constructed of, for example, rods, straps, and/or tubing. In one embodiment, the stand may also include a foot stand to aid in pushing the stand into the ground.

It is another aspect of the present disclosure to provide a flying waterfowl decoy that has a realistic appearance and is resistant to tearing and ripping. In one embodiment, a waterfowl decoy comprises colors and markings, including detailed feathering, that simulate a waterfowl. In some embodiments, the decoy may have a white underside and dark topside such that when the decoy whiffles, other fowl may see the white underside of the decoy. For example, a decoy may simulate the appearance of a goose or a duck. In some embodiments, a waterfowl decoy is constructed of a woven fabric. For example, a decoy may be constructed of a ripstock fabric. Fabric types may include, but are not limited to, cotton, silk, polyester, polypropylene, nylon, rayon, wool, leather, synthetic leather, poplin, tabinet, and/or combinations thereof. Additionally, materials often used in kites may be used in some embodiments. Such materials include plastic film, Dupont® Tyvek®, ripstop nylon, ripstop polyester, dacron, 200 or 420 denier nylon, mesh, screening, slit ripstops, and other nylons. Additionally, the material may have UV treatments to protect the material from the sun's UV rays. In other embodiments, the waterfowl decoy is constructed of plastic or other stiff material.

U.S. Pat. No. 6,044,581 issued to Shipman et al. on Apr. 4, 2000, ("Shipman") discloses a waterfowl decoy system for suspension over a predetermined location. The waterfowl decoy system comprises one or more waterfowl decoys that are similar to kites. More specifically, the waterfowl decoys have a specific gravity less than air and are attached to a string. Additionally, the waterfowl decoys are controlled by an apparatus that causes the waterfowl decoys to mimic different stages of a landing bird. The system includes a waterfowl decoy with orientation means enabling the user to control the flight orientation and posture of the waterfowl decoy. Shipman is hereby incorporated by reference herein in its entirety.

The term "waterfowl", as used herein, refers to certain wildfowl of the order Anseriformes. Waterfowl comprise members of the family Anatidae, which includes ducks, scoters, geese, and swans. Waterfowl also include saltwater shorebirds, (e.g., waders, gulls, pelicans, herons, etc.) and seabirds (e.g., albatross, etc.). Waterfowl are usually strong swimmers and some waterfowl are used by humans for game.

The term "yaw axis", as used herein, may be used interchangeably with the terms "first axis", "first axis of rotation", "first pivot axis", "z-axis", or "vertical axis". The yaw axis is a vertical axis running through the stand and is orthogonal to both the pitch axis (i.e., y-axis) and the roll axis (i.e., x-axis). The decoy assembly rotates about the stand and the yaw axis at a yaw rotation point—also called a "first rotation point" or a "first pivot point" herein.

The term "yaw", as used herein, refers to rotation about the yaw axis. "Yaw" is similar to "yaw" as used with aircraft dynamics. The yaw angle is relative to a vertical plane.

The term "roll axis", as used herein, may be used interchangeably with the terms "second axis", "second pivot axis", "second rotation axis", "x-axis", or "longitudinal axis". The roll axis is a horizontal axis running through the roll rotation point (also called the "second rotation point" or "second pivot point" herein) and also through the center of the decoy from its nose to its tail. The roll axis may also be defined by the interconnection mechanisms of the decoy assembly as shown in the figures described herein. The roll axis is orthogonal to both the pitch axis (i.e., y-axis) and the yaw axis (i.e., z-axis).

The term "roll", as used herein, refers to rotation about the roll axis. "Roll" is similar to "roll" as used with aircraft dynamics. The roll angle is relative to a horizontal plane.

The term "pitch axis", as used herein, may be used interchangeably with the terms "third axis", "third axis of rotation", "third rotation axis", "y-axis", or "lateral axis". The pitch axis is an axis running parallel to a line from one wingtip of the decoy to the other wingtip. The pitch axis may run through the waterfowl decoy's center of gravity or it may run through the connection points to which the decoy is attached to wing holders. Rotation about the pitch axis occurs at the "third rotation point" or "third point of rotation".

The term "pitch", as used herein, refers to rotation about the pitch axis. "Pitch" is similar to "pitch" as used with aircraft dynamics. The decoy is pitching up when its nose is above or higher than its tail.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C", and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more", and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the disclosure and together with the general description given above and the detailed description of the drawings given below, serve to explain the principles of these embodiments.

Figure 1:
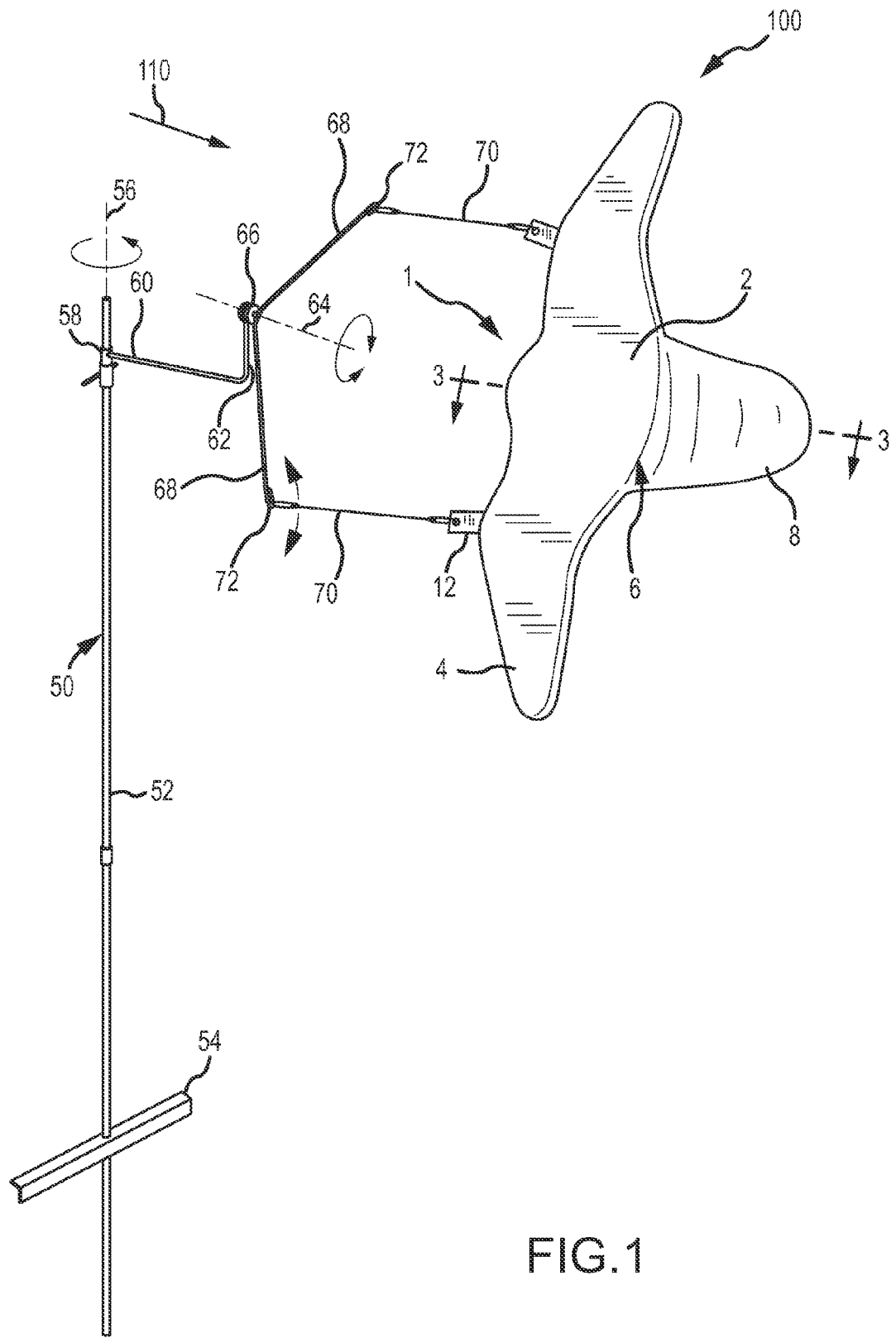
FIG. 1 is a perspective view of one embodiment of a flying decoy assembly.

It should be understood that the drawings are not necessarily to scale. In certain instances, details that are not necessary for an understanding of the disclosure or that render other details difficult to perceive may have been omitted. It should be understood, of course, that the claimed subject matter is not necessarily limited to the particular embodiments illustrated herein.

DETAILED DESCRIPTION

To assist in the understanding of the embodiments of the present invention the following list of components and associated numbering found in the drawings is provided herein:

| No. | Component |
|---|---|
| 1 | Decoy |
| 2 | Body |
| 4 | Wing |
| 6 | Hinge Point |
| 8 | Tail |
| 12 | Wing Attachment Mechanism |
| 14 | Weight Aperture |
| 20 | Topside of Decoy |
| 22 | Underside of Decoy |
| 30 | Exterior Material |
| 32 | Interior Material |
| 50 | Stand |
| 52 | Riser |
| 54 | Foot Stand |
| 56 | Yaw Axis |
| 58 | Yaw Rotation Point |
| 60 | Standoff |
| 62 | Dropdown |
| 64 | Roll Axis |
| 66 | Roll Rotation Point |
| 68 | Wing Holder |
| 70 | Wing Attachment |
| 72 | Connection Point |
| 80 | Fastener |
| 82 | Pin |
| 84 | Cotter Pin |
| 86 | Pin Body |
| 88 | Front Rotating Disk |
| 90 | Center Disk |
| 92 | Rear Stationary Disk |
| 100 | Flying Decoy Assembly |
| 110 | Wind Direction |

With reference to FIG. 1, a perspective view of one embodiment of a flying decoy assembly 100 is provided. The flying decoy assembly 100 depicted in FIG. 1 is shown in a flying configuration where wind at a wind direction 110 is present. In one embodiment, the flying decoy assembly 100 includes a flying decoy 1 pivotally interconnected to a stand 50 about a roll axis 64 (i.e., a pivot axis) such that the flying decoy 1 can rotate about the roll axis 64 at a roll rotation point 66. In one embodiment, the stand 50 includes a riser 52, a standoff 60, a foot stand, a yaw axis 56, and a yaw rotation point 58. In some embodiments, the standoff 60 may also comprise a dropdown 62. The riser 52 raises the flying decoy 1 above the ground, or water, a predetermined distance to provide an appearance of a waterfowl landing over water or a field. The riser 52 may be constructed in a variety of lengths. For example, in one configuration, the riser 52 has a length between thirty-six inches and ninety-six inches. The riser 52 may be constructed as a single piece or, alternatively, in multiple pieces that may disconnect and interconnect to enhance transportability. The stand may also comprise a collar to selectively adjust the height of the riser 52. The riser 52 may be interconnected to the ground in multiple fashions. For example, in one embodiment, a lower portion of the riser functions as a stake and may be inserted into the ground by stepping on the foot stand 54. The foot stand 54 may be located at any point along the riser 52 as long as the foot stand 54 does not interfere with the rotation of the standoff 60 and the flying decoy 1.

Referring back to FIG. 1, a standoff 60 is rotatably interconnected to the riser 50 at a yaw rotation point 58 (i.e., a first point of rotation or a first pivot point) about a yaw axis 56 (i.e. a first rotation axis or first pivot axis). The standoff 60 insures the waterfowl decoy 1 does not contact the riser 52 during operation. The rotatable interconnection between the standoff 60 and the riser 52 insures the stand can accommodate changes in the wind direction and thus allows the flying decoy 1 to face into the wind during operation. The yaw rotation point 58 allows the standoff 60 to rotate 360 degrees around the riser 52. In alternate embodiments, the flying decoy assembly 100 may not include a standoff 60 and/or a dropdown 62. Rather, the wing holder 68 may be directly attached to the stand 50 or riser 52 using a joint that allows rotation about 2 axes (both the yaw axis 56 and the roll axis 64). Further, in additional embodiments, the flying decoy assembly 100 may include a standoff 60 but not include a dropdown 62. In one embodiment, this may be configured using a joint on the riser 52 at the yaw rotation point 58 that allows the standoff 60 to rotate about the roll axis 64. Additionally, the joint may be attached to a ring or another joint that allows rotation around the yaw axis 56. In some embodiments, the top of the riser 52 may comprise a ball and socket joint such that the standoff 60 or the wing holders 68 may be attached to the stand 50 using the ball and socket joint. Additional joints and interconnection mechanisms known in the art may also be used in various embodiments.

The stand 50 may be constructed of, for example, rods, straps, and/or tubing. In one embodiment, the riser 52, standoff 60, and dropdown are all composed of sturdy rods, such as metal, wooden, or fiberglass rods. In another embodiment, the standoff 60 and dropdown 62 are one continuous piece. In other embodiments, the standoff 60 and dropdown 62 are two separate pieces and, thus, may be composed of different materials. In one embodiment (not shown) the standoff 60 may be a non-bendable material and the dropdown 62 may be a strap or other bendable component. Additionally, in some embodiments, the dropdown 62 may point upward (as shown in FIG. 1). In other embodiments, the dropdown 62 may point downward (not shown).

In FIG. 1, a first end of the dropdown 62 interconnects to the standoff 60 and a second end of the dropdown 62 interconnects to a wing holder 68 at a roll rotation point 66 (also called a "second rotation point" or a "second pivot point"). The roll rotation point 66 allows the wing holder 68 to rotate about a roll axis 64. This pivotal interconnection (the roll rotation point 66) between the wing holder 68 and the stand 50 allows the flying decoy 1 to simulate a whiffling motion—a motion that allows waterfowl to release air below their wings to quickly descend and land. In some embodiments, the wing holder 68 may comprise two arms and a central pivot point. The wing holder 68 may rotate about the roll rotation point 66 plus or minus 120 degrees. In alternate embodiments, stoppers (or other rotation control means) may be placed on the roll rotation point 66 such that the wing holder 68 may only rotate a limited amount, i.e., only rotate +/−30 degrees. In one embodiment, each end (or arm) of the wing holder 68 extends downward from the center of the wing holder 68 at an angle of about twenty degrees relative to a horizontal plane. In another embodiment, each end (or arm) of the wing holder 68 extends downward from the center of the wing holder 68 at an angle greater than about 25 degrees relative to a horizontal plane. In another embodiment, each end (or arm) of the wing holder 68 extends downward from the center of the wing holder 68 at an angle less than about 18 degrees relative to a horizontal plane.

The standoff 60 may include a first end with a rotation aperture adapted for interconnection to a riser 52 and a second end integrally interconnected to a dropdown 62. The dropdown 62 may include a pivot aperture adapted for interconnection to a wing holder 68. In one embodiment, the standoff 60 and the dropdown 62 are constructed of a single piece of material, which may be, for example, a metal, an alloy, or a plastic. In one configuration, the standoff 60 and the dropdown 62 are a strap constructed of steel.

A wing attachment 70 (also called a "tether" herein) interconnects the wing holder 68 to the flying decoy 1 at a connection point 72, which may also be called an interconnection point herein. In one embodiment, the wing attachment is interconnected to the wing holder with a metal clip, two loops, a hook and a loop, a lock, epoxy, a snapping mechanism, or other known attachment mechanisms. The wing attachment 70 allows the flying decoy 1 to move horizontally and/or vertically in response to changes in the wind speed, and thus the decoy simulates a floating movement if the wind increases in speed and a dipping movement if the wind decreases in speed. In some embodiments, the flying decoy 1 as shown in FIG. 1 will rotate about the pitch axis, which is an axis running through the connection points 72. This pitch rotation occurs at the connection points (also called the "third rotation point" or the "third point of rotation" herein). Rotation about the pitch axis may range from 0 to 180 degrees (where 0 degrees is when the assembly is stationary and the decoy 1 is hanging down from the wing attachments 70 such that the decoy is parallel to the riser and 90 degrees is when the decoy 1 is parallel to the ground). Furthermore, the flying decoy 1 may move or sway from side-to-side at the connection point 72. Thus, in some embodiments, there are at least two directions of movement or axes of rotation at the connection point 72.

The flying decoy 1 depicted in FIG. 1 generally includes a body 1, two wings 4, and a tail 8 configured to flap vertically about a hinge point 6. In one configuration, the tail has a range of motion of 180 degrees. The body 2 may comprise a forward end and a rear end and a tail 8 hingedly interconnected to the rear end of said body 2.

The flying decoy 1 may be attached to the wing attachments 70 using wing attachment mechanisms 12. The wing attachment mechanisms 12 may be material, plastic, metal, or other material and may include eyelets through which the wing attachments 70 may be interconnected or snaps to interconnect the wing attachments 70. The wing attachment mechanisms 12 may be sewn or glued onto or in the flying decoy 1. In alternate embodiments, the wing attachment mechanisms 12 may be a part of the flying decoy 1 and not separate components. The wing attachment mechanisms 12 may be the same material as the flying decoy material or composed of a different material, for example, a strap, webbing, snaps, clips, etc.

The flying decoy assembly 100 depicted in FIG. 1 can operate in a variety of wind speeds. For example, in one configuration, the flying decoy assembly can simulate the landing characteristics of waterfowl in wind speeds of about five miles per hour and higher. If no wind is present, a motor may be attached to the roll rotation point 66 to rotate the wing holder 68.

Note that the flying decoy assembly 100 is not shown in a stationary configuration or in a windless environment. If the flying decoy assembly 100 was shown in a stationary, windless configuration, the decoy 1 would hang straight down and the wing holders would be symmetrical relative to the roll rotation point 66.

Rotation about the pitch axis may be caused by a vertical force applied to the waterfowl decoy 1 either forward (toward the decoy's nose) or aft (toward the decoy's tail 8) of the decoy's 1 center of gravity. Rotation about the pitch axis may also be caused by the direction and speed of the wind as applied to the decoy assembly 100. The connection points 72 may also be referred to herein as the third rotation points. Rotation about the roll axis 64 may be caused by a vertical force applied to one of the waterfowl decoy's wings 4. Rotation about the roll axis 64 may also be caused by the direction and speed of the wind as applied to the decoy assembly 100. The decoy 1 is rolling to the right when its left wing 4 is above or higher than its right wing 4.

Figure 2A:
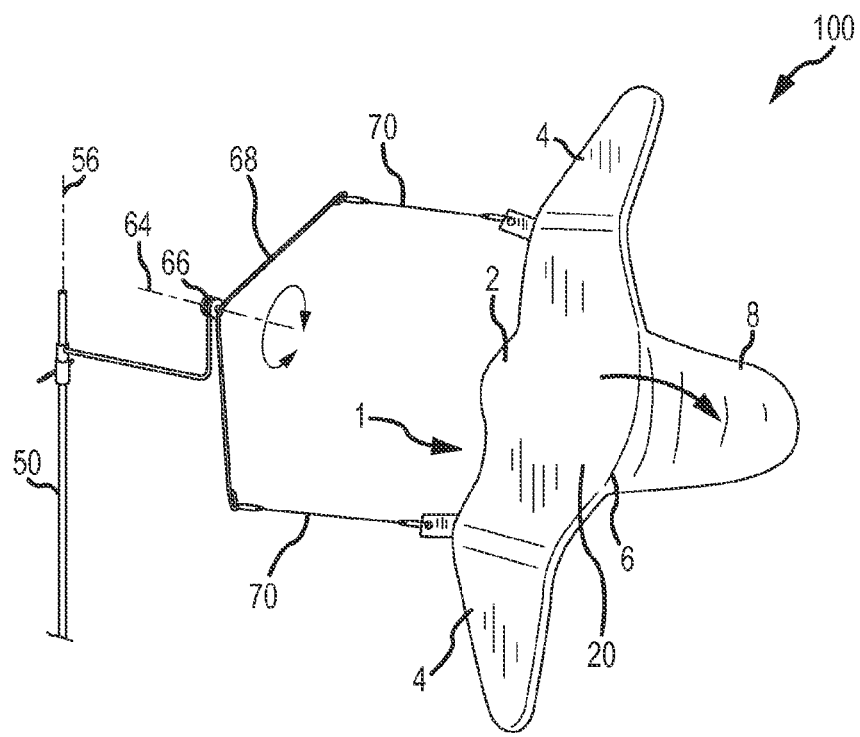
FIGS. 2A-2B are perspective views of one embodiment of a flying decoy assembly illustrating a whiffling motion.
Figure 2B:
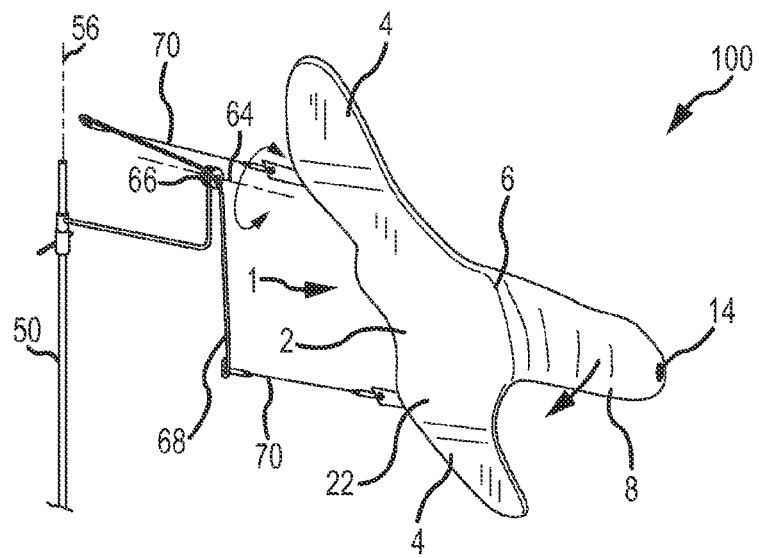

Referring now to FIGS. 2A-2B, a perspective view of one embodiment of a flying decoy assembly 100 illustrating a whiffling motion is provided. As depicted, the waterfowl decoy 1 rotates about the roll rotation point 64. The rotation simulates a whiffling motion, in which waterfowl rotate during flight to release air below their wings to quickly descend and land.

As illustrated, a flying decoy 1 is pivotally interconnected to a stand 50 at a roll rotation point 66. The waterfowl decoy includes a body 2, two wings 4 attached to opposing sides of the body 3, and a tail 8 attached to a rear end of the body 2. A head may be attached to a front end of the body 2 (not shown). Additionally, the tail 8 may be comprised of a flexible material and may flap at a hinge point 6. The topside 20 of the decoy 1 is shown in FIG. 2A. The bottom side 22 of the decoy 1 is shown in FIG. 2B. A wing holder 68 and a wing attachment 70 interconnect the flying decoy 1 to the stand 50. The wing holder 68 includes a first end, a second end, and a center point positioned between the first end and the second end. The center point of the wing holder pivotally connects to the stand 50 at the roll rotation point 66 to allow the waterfowl decoy to rotate about the roll axis 64 and simulate a waterfowl whiffling during landing. The ends of the wing holder 68 interconnected to the wing attachments 70 also independently rotate to provide the wings with a flapping motion. This rotation is the pitch in one direction and a swinging movement in the side-to-side direction. The wing attachment 70 interconnects the ends of the wing holder 68 to the wings 4 of the flying decoy 1. Rotation at the point where the wing attachment 70 interconnects to the wing 4 may also be permitted to allow further movement and breathe additional life into the flying decoy 1. The wing attachment 70 may be, but is not limited to, a cord, a string, a wire, dowel, tube, bar, beam, webbing, strap, and/or other suitable attachment means known in the art.

FIG. 2B shows one embodiment of the decoy 1, which may include a weight aperture 14 in the tail 8. The weight aperture 14 may be an eyelet through which a weight may be added for high winds. In other embodiments, the weight aperture 14 may receive a sleeve with a weight. In additional embodiments, the weight aperture 14 may be a slit into which weights may be slid. In other embodiments, the weight aperture 14 may include Velcro or other hook and loop material to interconnect the weights to the tail 8. The weight may be a single unit or component. In various embodiments, the weight may comprise many smaller components such as pellets. If smaller weight components are used, less weight may be added for low wind conditions and more weight may be added for higher wind conditions. In some embodiments, the weight or weights may clip, snap, hook, clamp, stick, slide, or attach to the tail 8 in any other manner known in the art.

The flying decoy 1 depicted in FIGS. 2A-B may incorporate colors and markings, including feathering, on a topside 20 of the decoy 1. An underside 22 of the decoy 1 may include colors and markings as well. In some embodiments, the topside 20 of the decoy has colors and markings while the underside 22 of the decoy is white. Many types of waterfowl have a white underside. The white underside configuration allows birds to see the difference in the topside 20 and the underside 22 more easily and thus makes the decoy more effective. In one embodiment, the colors and markings are painted on the flying decoy 1. In other embodiments, the material of the flying decoy 1 may be printed and/or sublimated.

Figure 3:
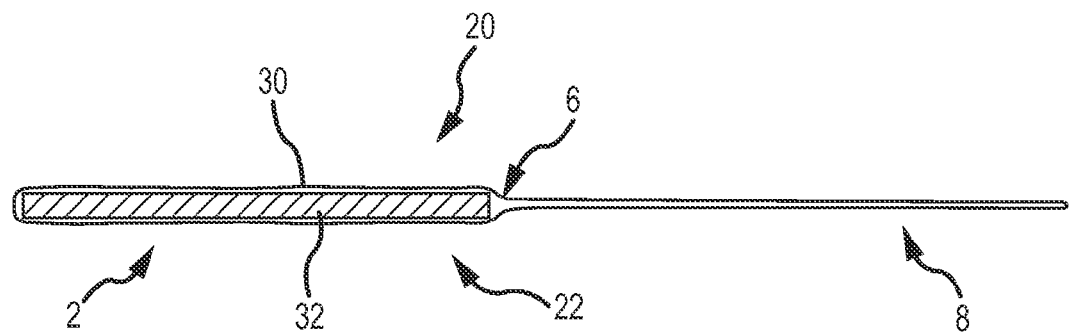
FIG. 3 is a side view of a cross-section of one embodiment of a decoy.

Referring to FIG. 3, a cross-section side view of one embodiment of a flying decoy is depicted at cut 3-3 of FIG. 1. As depicted, the waterfowl decoy comprises a body 2, a tail 8, a hinge point 6, an underside 22, a topside 20, exterior material 30, and interior material 32 (which may also be called a substrate). The interior material 32 may include a reinforcement member that extends laterally and longitudinally across the body 2 and a portion of both wings. In one embodiment, the portion of each wing not attached to the reinforcement member can move, or rotate, to simulate a flapping motion of the distal portions of the wings (not shown). In an alternative embodiment, the reinforcement member reinforces the entire body and both wings. The interior material 30 may be constructed of closed cell foam, Styrofoam, polyurethane, polyethelyne, plastic, thick material, wood, fiberglass, carbon fiber, or any other rigid or slightly bendable, light material to provide rigidity to the body and a portion of the wings while adding minimal weight to the decoy.

The interior material 32 of the body 2 may be interconnected to the interior material 32 of the wings using methods known in the art, including, for example, gluing, taping, adhesives, bonding, and/or stitching. In one embodiment, a portion of the wing attachment is positioned between the exterior material 30 of the topside 20 and the exterior material 30 of the underside 22 of the waterfowl decoy, and then the exterior material 30 of the topside 20 and the exterior material 30 of the underside 22 are interconnected together. As illustrated, the reinforcement member does not extend into the tail in one embodiment. Thus, in some embodiments, the rigidity of the tail is reduced, resulting in the tail having an increased range of motion. In one embodiment, the tail has 180 degrees of movement.

Figure 4:
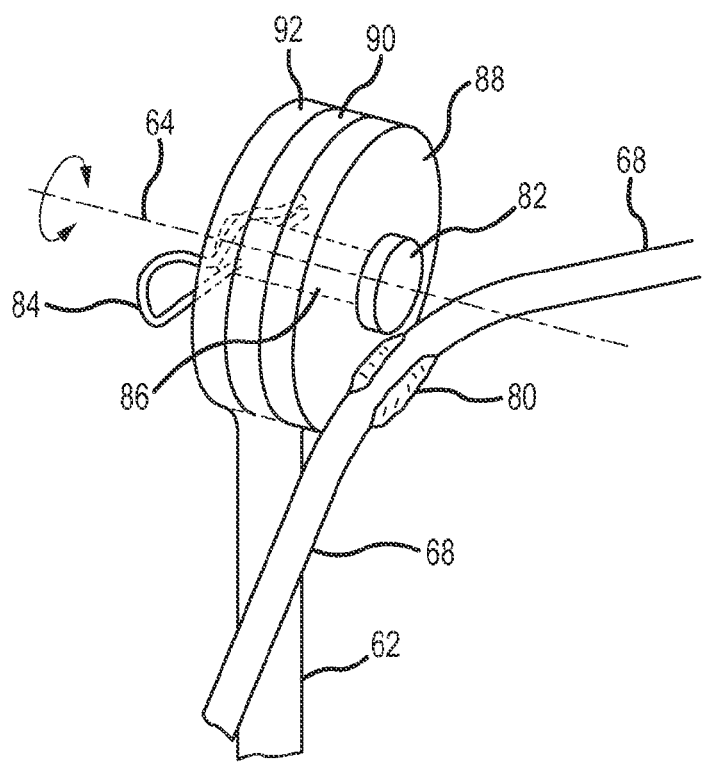
FIG. 4 is a perspective view of one embodiment of a rotating joint.

FIG. 4 shows one embodiment of a pivot mechanism located at the roll rotation point interconnecting a wing holder 68 and the stand, specifically the dropdown 62 of the stand in the embodiment shown. As depicted, the wing holder 68 includes a pivot aperture formed at the center point between a first end and a second end of the wing holder 68. The pivot aperture is configured to accommodate a fastener 80, which may be a clamp, hook, etc. The fastener 80 pivotally interconnects the wing holder 68 to the stand. For example, in one configuration, a bolt, washer, or a pin interconnects the wing holder 68 to the stand.

The embodiment of the joint of the roll rotation point shown in FIG. 4 comprises a pin 82, a pin body 82, a cotter pin 84, a front rotation disk 88, a center disk 90 (which may be a bearing in some embodiments), a rear stationary disk 92, and a roll axis 64. The fastener 80 may be interconnected to the front rotating disk 88 and thus rotate the wing holder 68, which in turn makes the decoy whiffle. The front rotation disk 88 may also be referred to as a washer. The rear stationary disk may be interconnected to or a part of the dropdown 62. The term "cotter pin" as used herein may refer to a bowtie cotter pin, split pin, R-clip (i.e., R-pin, R-key, hairpin cotter pin, hairpin cotter, bridge pin, hitch pin, or spring cotter pin), linchpin, or a circle cotter. The cotter pin 84 shown in FIG. 4 is a hairpin cotter pin, which is a fastener made of a springy material, commonly hardened metal wire, resembling the shape of the letter "R". In alternate embodiment, any other type of cotter pin or other pin may be used in the place of the hairpin cotter pin 84.

In some embodiments, the joint of the roll rotation point may include a washer or a nut that may be tightened or loosened to allow the wing holder 68 to rotate around the roll axis 64 more or less freely. Thus, in high winds it may be desired that the rotation be limited and the wing holder 68 rotate less freely. In alternate embodiments, the pin 82 and the cotter pin 84 may be configured such that they can be tightened to restrict rotation of the front rotating disk 88. Thus, the nut, washer, stopper, etc. may be referred to herein as a rotation control means.

In alternate embodiments, the joint of the roll rotation point may be a ball and socket joint, knuckle joint, swivel joint, rotating joint, cylindrical joint, pivot joint, condyloid joint (also called a condylar, ellipsoidal or bicondylar joint), rotary joint, or other joint known in the art. In additional or alternative embodiments, the joint of the roll rotation point may comprise a sleeve or a piece of material or a loop that interconnects around the end of the dropdown 62 or the end of the standoff.

The wing holder 68 and roll rotation point are configured to allow the wing to flap, float, dip, and rotate. In one embodiment, each end of the wing holder 68 can rotate independently about the pivot aperture or the roll rotation point. For example, in one configuration, each end of the wing holder has an independent range of motion of about forty degrees relative to the pivot aperture. In one embodiment, the wing holder is adjustable to change the size of the pivot aperture. For example, in one configuration, the pivot aperture may be tightened around an interconnecting bolt, washer, or pin, thereby affecting the degree of movement of the wing holder based on wind conditions. In one embodiment, the wing holder is a rod constructed of a metal, an alloy, or a plastic. For example, in one configuration, the wing holder is a rod constructed of steel.

While various embodiments have been described in detail, it is apparent that modifications and alterations of those embodiments will occur to those skilled in the art. However, it is to be expressly understood that such modifications and alterations are within the scope and spirit of the claimed invention, as set forth in the following claims.

What is claimed is:

1. A waterfowl decoy assembly for simulating the landing characteristics of waterfowl, comprising:
   a stand;
   a standoff pivotally interconnected on a first end to said stand about a first pivot axis, which allows rotation of said standoff based on wind direction;
   a waterfowl decoy comprising a body, a first wing, a second wing, and a tail hingedly interconnected to a rear portion of said body at a hinge point;
   a wing holder having a first arm and a second arm;
   a first tether interconnecting said first wing to said first arm;
   a second tether interconnecting said second wing to said second arm;
   wherein said wing holder is rotatably interconnected to a second end of said standoff and pivots about a second pivot axis; and
   wherein said waterfowl decoy whiffles side to side to replicate a landing bird.

2. The waterfowl decoy assembly of claim 1, wherein said wing holder is configured to provide said first and second wings with a gliding, floating, or dipping motion.

3. The waterfowl decoy assembly of claim 2, wherein said wing holder further comprises a central pivot point which is rotatably interconnected to said standoff.

4. The waterfowl decoy assembly of claim 1, wherein said body comprises a first thickness, wherein said tail comprises a second thickness which is different from said first thickness, and wherein said tail flaps at said hinge point.

5. The waterfowl decoy assembly of claim 1, wherein said decoy rotates between zero and 90 degrees with respect to a horizontal plane around said second pivot axis.

6. The waterfowl decoy assembly of claim 1, wherein said body and said first and second wings are comprised of a low density foam covered by a fabric.

7. The waterfowl decoy assembly of claim 6, wherein said tail is comprised of a flexible fabric material.

8. The waterfowl decoy assembly of claim 1, wherein said wing holder is interconnected to said standoff with at least one of a pin and a washer, a ball and a socket, a knuckle joint, a swivel joint, a cylindrical joint, a condyloid joint, and a rotary joint which allows rotation of said wing holder around a substantially horizontal plane.

9. A waterfowl decoy system which has movement in at least 3 distinct directions to simulate a landing bird, comprising:
   a stand having a first end adapted for penetrating a ground surface, and a second end elevated above said first end, said stand having a substantially vertical longitudinal axis;
   a standoff with a first end rotatably interconnected to said stand proximate to said second end, wherein said standoff rotates around said substantially vertical longitudinal axis of said stand;
   a decoy comprising a body with a forward end and a rear end, two opposing wings interconnected to said body and a tail hingedly interconnected to said rear end of said body at a hinge point;
   a wing holder having a first arm and a second arm;
   a first tether interconnecting a first wing of said two opposing wings to said first arm and a second tether interconnecting a second wing of said two opposing wings to said second arm; and
   a pivot mechanism interconnecting a portion of said standoff to said wing holder, and which allows rotation about a second substantially horizontal axis, wherein said decoy rotates about said stand in a first direction and rotates about said standoff in a second direction, and the tail rotates about the hinge point in a third direction.

10. The waterfowl decoy system of claim 9, wherein said first direction is different from said second direction and said third direction, and wherein said second direction is different from said third direction.

11. The waterfowl decoy system of claim 9, wherein said body of said decoy and said two opposing wings are comprised of a substrate and an exterior fabric material and said tail is comprised of said exterior fabric.

12. The waterfowl decoy system of claim 9, further comprising at least one of an aperture and a sleeve in a portion of said tail to allow interconnection of one or more weights.

13. The waterfowl decoy system of claim 9, wherein said pivoting mechanism is comprised of at least one of a pin and a washer, a ball and a socket joint, a knuckle joint, a swivel joint, a cylindrical joint, and a condyloid joint.

14. The waterfowl decoy system of claim 9, wherein said decoy can rotate about said standoff between about zero and 100 degrees to replicate a whiffling motion of a landing bird.

15. The waterfowl decoy system of claim 9, wherein said pivoting mechanism further comprises a rotation control means which can selectively control a degree of rotation.

16. The waterfowl decoy system of claim 9, wherein said stand comprises a foot stand on positioned proximate said first end and a plurality of interconnectable pieces to allow adjustment of a total vertical height.

17. The waterfowl decoy system of claim 9, wherein said standoff has a sleeve on said first end, and wherein said sleeve is adapted to fit over an upper portion of said stand to allow rotation of said standoff.

18. The waterfowl decoy system of claim 9, wherein a height of said standoff on said stand can be selectively adjusted with a collar positioned on said stand.

19. The waterfowl decoy system of claim 9 further comprising a first interconnection point located where said first tether interconnects to said first arm and a second interconnection point located where said second tether interconnects to said second arm, wherein said decoy rotates about said first interconnection point and said second interconnection point in a fourth direction.

* * * * *